(12) United States Patent
Hansen et al.

(10) Patent No.: US 9,718,221 B2
(45) Date of Patent: *Aug. 1, 2017

(54) METHODS, SYSTEMS, AND DEVICES FOR RADIO-FREQUENCY ASSISTED REMOVAL OF SEALANT

(71) Applicant: The Boeing Company, Chicago, IL (US)

(72) Inventors: Darrin M. Hansen, Seattle, WA (US); Carissa Ann Pajel, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,572

(22) Filed: Feb. 1, 2016

(65) Prior Publication Data

US 2016/0151944 A1     Jun. 2, 2016

Related U.S. Application Data

(63) Continuation of application No. 14/282,743, filed on May 20, 2014, now Pat. No. 9,283,598.

(51) Int. Cl.
*B05D 3/00* (2006.01)
*C08J 7/18* (2006.01)
(Continued)

(52) U.S. Cl.
CPC ............ *B29C 41/42* (2013.01); *B08B 7/0071* (2013.01); *B08B 9/08* (2013.01); *B29C 35/0805* (2013.01); *B29C 35/12* (2013.01); *B29C 41/003* (2013.01); *B29C 41/52* (2013.01); *B29C 66/53461* (2013.01); *B29C 73/02* (2013.01); *B29C 73/26* (2013.01); *B29C 73/34* (2013.01); *B64C 3/34* (2013.01); *B64F 5/45* (2017.01); *B65D 53/06* (2013.01); *B08B 1/00* (2013.01); *B08B 7/0035* (2013.01); *B29C 2035/0811* (2013.01);
(Continued)

(58) Field of Classification Search
CPC ... C09D 5/008; C09D 5/20; C09J 5/06; C09K 3/10; C09K 3/12; B08B 9/08; B65D 53/06
See application file for complete search history.

(56) References Cited

U.S. PATENT DOCUMENTS 6,855,760 B1     2/2005  Kirsten et al.
7,407,704 B2     8/2008  Kirsten
(Continued)

*Primary Examiner* — Michael Wieczorek
(74) *Attorney, Agent, or Firm* — Dascenzo Intellectual Property Law, P.C.

(57) ABSTRACT

Cured flexible sealant may be removed from a substrate if the cured flexible sealant includes within its volume a susceptor such as metal susceptor particles. Removal proceeds by exposing the sealant with the susceptor to radio-frequency radiation sufficient to cause dielectric heating in the susceptor. The consequent heating in the cured sealant reduces the bond strength of the cured sealant. The reduced bond-strength sealant may be removed by physical methods, such as scraping etc., much more easily than the original (unexposed) cured sealant. Also disclosed are sealant compositions with susceptor, susceptor tools to introduce susceptor into cured sealant, and handheld radio-frequency heaters to apply radio-frequency radiation to cured sealant.

10 Claims, 3 Drawing Sheets

(51) Int. Cl.
*G21H 5/00* (2006.01)
*B29C 41/42* (2006.01)
*B08B 9/08* (2006.01)
*B65D 53/06* (2006.01)
*B29C 73/02* (2006.01)
*B29C 73/26* (2006.01)
*B29C 73/34* (2006.01)
*B29C 35/08* (2006.01)
*B29C 35/12* (2006.01)
*B29C 41/00* (2006.01)
*B29C 41/52* (2006.01)
*B29C 65/00* (2006.01)
*B64C 3/34* (2006.01)
*B64F 5/45* (2017.01)
*B08B 1/00* (2006.01)
*B08B 7/00* (2006.01)
*B29L 31/00* (2006.01)
*B29K 85/00* (2006.01)
*B29K 105/16* (2006.01)
*B29K 505/00* (2006.01)
*B29L 31/26* (2006.01)
*B29L 31/30* (2006.01)

(52) U.S. Cl.
CPC ............ *B29C 2035/0855* (2013.01); *B29C 2035/0861* (2013.01); *B29K 2085/00* (2013.01); *B29K 2105/16* (2013.01); *B29K 2505/00* (2013.01); *B29L 2031/26* (2013.01); *B29L 2031/3076* (2013.01); *B29L 2031/7172* (2013.01); *Y10T 156/1158* (2015.01); *Y10T 156/1917* (2015.01)

(56) References Cited

U.S. PATENT DOCUMENTS

| | | | |
|---|---|---|---|
| 7,569,624 B2 * | 8/2009 | Kolbe | C08J 9/10 523/200 |
| 9,283,598 B2 * | 3/2016 | Hansen | B29C 73/02 |
| 2004/0249042 A1 * | 12/2004 | Scheifers | B09B 5/00 524/430 |
| 2012/0160828 A1 * | 6/2012 | Bowman | B29C 65/3612 219/603 |
| 2012/0276381 A1 * | 11/2012 | Cypcar | B32B 43/006 428/355 N |

* cited by examiner

METHODS, SYSTEMS, AND DEVICES FOR RADIO-FREQUENCY ASSISTED REMOVAL OF SEALANT

RELATED APPLICATION

This application is a continuation of U.S. patent application Ser. No. 14/282,743, which was filed on May 20, 2014, issued on Mar. 15, 2016 as U.S. Pat. No. 9,283,598, and is entitled "METHODS, SYSTEMS, AND DEVICES FOR RADIO-FREQUENCY ASSISTED REMOVAL OF SEALANT," the complete disclosure of which is incorporated herein by reference.

FIELD

The present disclosure relates to methods, systems, and devices for radio-frequency assisted removal of sealant.

BACKGROUND

Aerospace sealants are widely used in aircraft production as both fuel tank and fuselage sealing systems. Brushcoat (Class A) sealants and fillet (Class B) sealants may be used as a B over A system or B-only system. For composite fuel tanks, in particular, the dimensional application requirements are very stringent, for example, to ensure integrity where the sealant system is used as an ignition source prevention feature during a lightning strike event. When these requirements are not met, sealant must be removed and the area reworked. The allowed methods for sealant removal are carefully controlled to avoid damage to the underlying composite, limiting the technicians to tedious and time-consuming tools and processes, such as scraping with plastic tools.

Aerospace sealants are very difficult to remove from composite or metal substrates by traditional mechanical or chemical means. There are very few chemicals available that sufficiently weaken the sealant to aid in removal and even fewer that do not introduce a risk to an underlying composite substrate. Mechanical means are typically limited to scrapers. When the underlying substrate is a composite, these scrapers are made of a material softer than the composite to avoid damage. Use of either, or both, mechanical means and chemical means may be a slow process, potentially taking hours to complete.

The existing solutions for aircraft applications include (a) mechanical means by using manual or automated scrapers made of materials softer than the substrate and (b) chemical means by using extremely basic or acidic materials to soften the sealant. Method (a) is a very delicate and lengthy process to avoid damaging the substrates, especially composite substrates. Method (b) is a very delicate and often lengthy process as the chemicals can easily damage coated and uncoated substrates. For metal substrates, the risk is the potential for initiation of corrosion. For composites, the risk is structural degradation of the substrate through gouging and damage to the underlying load bearing composite material.

Hence, there is a need for sealant removal methods, systems, and devices that are less delicate, less likely to damage the substrate, less time consuming, and/or less tedious.

SUMMARY

The present disclosure relates to methods, systems, and devices for radio-frequency (RF) assisted removal of cured flexible sealant. Systems may comprise a substrate, a cured sealant bonded to the substrate, a susceptor within the cured sealant, a sealed interface formed at least in part by the substrate and the cured sealant, and an RF heater, and/or an RF emitter, emitting a beam of RF radiation, where at least a portion of the beam is absorbed by the susceptor inside the cured sealant. Such systems operate by applying energy in the form of RF radiation to the cured sealant. The cured sealant typically absorbs little to none of the RF radiation. Therefore, the cured sealant includes a susceptor within the volume of the sealant that is configured to absorb the RF radiation within the sealant volume. The susceptor also is configured to heat due to the absorbed RF radiation and, thereby, to heat the surrounding volume of sealant. The susceptor in the cured sealant is configured to absorb sufficient RF energy to heat the sealant to the point where the bond strength of the sealant is reduced. The reduced bond-strength sealant may then be removed by physical methods (e.g., scraped, peeled) more easily than the unaffected (original), cured sealant.

Methods include exposing a volume of a cured flexible sealant to RF radiation, sufficient to heat a susceptor within the volume to form a reduced bond-strength sealant; and physically removing the reduced bond-strength sealant. Such methods may comprise introducing susceptor into the cured sealant, prior to the exposing. The introducing may include penetrating the cured sealant with susceptor such as a susceptor needle. The introducing may include mixing the susceptor into an uncured sealant and curing the sealant to form the cured sealant. Further, methods may comprise selecting a sealant that includes susceptor and/or curing an uncured sealant that includes susceptor to form the cured sealant.

Methods may be a method of sealing an interface on an aircraft to form, e.g., a sealed joint, a fillet, or an end-cap seal. For example, the method of sealing may include sealing the interface by applying uncured sealant to the interface and by curing the uncured sealant to form a first cured flexible sealant at the interface (a first seal). Sealing the interface may include bonding the sealant to a substrate such as a composite material, e.g., a fiber-reinforced plastic. The sealant may include metal susceptor particles. The sealant may be a synthetic rubber, a polysulfide, a polyurethane, a polyurea, a polythioether, and/or an epoxy sealant.

If the first seal is to be reworked, e.g., due to an improper seal, the method may continue by exposing a volume of the first cured flexible sealant to microwave radiation that is sufficient to heat the metal susceptor particles within the volume to form a reduced bond-strength sealant. The reduced bond-strength sealant may be physically removed, e.g., by scraping, etc., to prepare the interface for another seal. Then, the method may include sealing the interface by applying uncured sealant a second time to the interface and by curing the uncured sealant to form a second cured flexible sealant at the interface (a second seal).

DESCRIPTION

Figure 1:
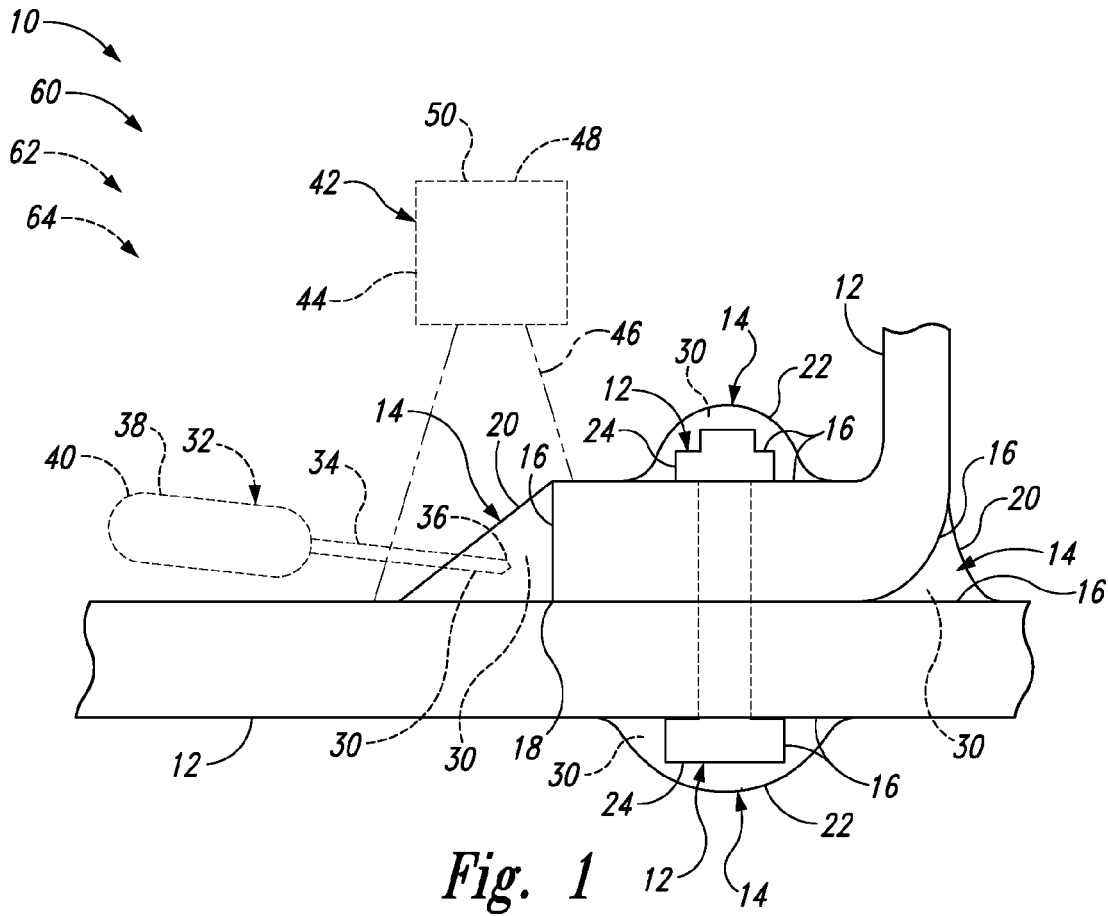
FIG. 1 is a schematic representation of a system for radio-frequency assisted removal of sealant.

FIGS. 1-5 illustrate systems and methods for RF assisted removal of sealant, and components thereof. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

FIG. 1 illustrates systems 10 for RF assisted removal of sealant 14. Generally, systems 10 comprise a substrate 12, a cured sealant 14 bonded to the substrate 12, a susceptor 30 within the cured sealant 14, a sealed interface 16 formed at least in part by the substrate 12 and the cured sealant 14, and an RF heater 42, and/or an RF emitter 44, emitting a beam 46 of RF radiation, where at least a portion of the beam 46 is absorbed by the susceptor 30 inside the cured sealant 14. The system 10 operates by applying energy in the form of RF radiation to the cured sealant 14. The cured sealant 14 typically absorbs little to none of the RF radiation. Therefore, the cured sealant 14 includes a susceptor 30 within the volume of the sealant 14 that is configured to absorb the RF radiation within the sealant volume. The susceptor 30 also is configured to heat due to the absorbed RF radiation and, thereby, to heat the surrounding volume of sealant 14 via conduction. The susceptor 30 in the cured sealant 14 is configured to absorb sufficient RF energy to heat the sealant 14 to the point where the bond strength of the sealant 14 is reduced. The reduced bond-strength sealant 14 may then be removed by physical methods (e.g., scraped, peeled) more easily than the unaffected (original), cured sealant 14.

The substrate 12 bonded to the sealant 14 generally is a support structure or component thereof, although sealant 14 may be bonded to virtually any object. For example, the substrate 12 may be at least a portion of an aircraft 60, a fuel tank 62, and/or a fuselage 64. The substrate 12 may be at least a portion of a fastener 24, a conduit, a structure, a device, and/or other equipment. Substrates 12 may include, or may be, a composite material, a fiber-reinforced plastic, a carbon-fiber composite, carbon-fiber reinforced composite, a laminate material, a polymer, a reinforced polymer, a filled polymer, and/or a metal. Substrates 12 may be coated, protected, and/or bare, and may, or may not, include coatings, and surface protectants. Typically, substrates 12 do not significantly absorb RF energy. Conductive substrates 12 and substrates 12 that include conductive materials may reflect RF energy.

The sealant 14 may seal a substrate 12 and/or a sealed interface 16 in a leak-free manner, to prevent significant liquid and/or gas flow through the seal. The sealant 14 bonds to the substrate 12 and may also be called an adhesive. The sealant 14 may substantially isolate the substrate 12 and/or the sealed interface 16 from a neighboring environment thereby protecting the substrate 12 and/or the sealed interface 16 from the environment and/or vice versa. The sealant 14 may form a flexible seal and remain flexible and/or resilient when cured and bonded to the substrate 12. Cured sealant 14 may be relatively soft, with a hardness of less than 90, 80, 70, 60, 50, 40, 30, or 20 on the Shore-A hardness scale. The cured sealant 14 may be a synthetic rubber, a polysulfide, a polyurethane, polyurea, polythioether, and/or an epoxy. Hence, the uncured sealant 14 may be, or may include, one or more uncured sealant components 28 (not illustrated in FIG. 1), e.g., a sealant precursor, a component of a sealant, a catalyst, a reactant, and/or a solvent. Typically, unless the sealant 14 includes susceptor 30, as described further herein, the sealant 14 does not significantly absorb RF energy.

The sealant 14 bonded to the substrate 12 forms a sealed interface 16. The sealed interface 16 may be, and/or may include, a sealed joint 18, a fillet 20, and/or a seal cap 22. The sealed interface 16 may be due to a purposeful, a consequential, and/or a mistaken application of sealant 14. For example, the sealed interface 16 may include sealant 14 extruded through a joint, crack, and/or gap. A fillet 20 is an application of sealant 14 at an edge, edges, and/or a corner of a substrate 12 and/or a joint between substrates 12. A seal cap 22 is typically an application of sealant 14 over a substrate 12, such as a fastener 24, to encapsulate at least a portion of the substrate 12 (e.g., sealant 14 forming a sealed interface 16 over the end of a fastener 24 such as a nut and/or a fastener head).

Typically, the sealant 14 in the sealed interface 16 is thick enough to seal, to protect, and/or to isolate the sealed interface 16, e.g., to seal against leaking liquid and/or gas, to protect, and/or isolate from environmental exposure and/or exposure to industrial chemicals such as fuel, and/or to electrically isolate components from undesired electrical discharge. The sealed interface 16 may have a thickness of sealant 14 of at least 0.5 mm, 1 mm, 2 mm, 3 mm, 4 mm, 5 mm, 6 mm, or 8 mm, and/or less than 20 mm, 15 mm, 12 mm, 10 mm, 8 mm, or 6 mm. For example, a typical fillet 20 may extend away from the edge(s) and/or corner about 1-6 mm. As another example, a typical seal cap 22 may extend away from the fastener 24 about 2-4 mm.

RF radiation is electromagnetic radiation with a frequency between about 30 kHz and 300 GHz. The RF spectrum includes the microwave spectrum, i.e., frequencies between about 300 MHz and 300 GHz. Use of RF frequencies is generally regulated by governments. Hence, not all frequencies may be suitable in all environments.

When materials absorb RF energy, the energy typically is converted to heat via dielectric heating, also known as RF heating. The efficiency of dielectric heating (including absorption and penetration depth) may vary according to the frequency. Hence, particular bands of the RF spectrum may be more useful for dielectric heating. Suitable bands may be within the ranges of 30 kHz-300 GHz, 1 MHz-300 MHz, 300 MHz-300 GHz, 800 MHz-30 GHz, 2 GHz-20 GHz, about 915 MHz, about 2.45 GHz, and/or about 5.8 GHz.

At RF frequencies, electromagnetic radiation typically penetrates into the interior of materials. Therefore, dielectric heating typically is volume heating, where the absorption and heating takes place in the interior of the material and at the surface of the material.

Suitable power levels are influenced by the target object absorption, proximate structures, desired amount of heating, and/or desired speed of heating. As discussed further herein, RF radiation may be emitted by a handheld RF heater 42, which would further constrain practical RF radiation power levels. Suitable power levels of a beam 46 of RF radiation may be less than 1000 W, 300 W, 100 W, 30 W, 10 W, 3 W, or 1 W, and/or greater than 0.1 W, 0.3 W, 1 W, 3 W, or 10 W.

Many materials, such as plastics and polymers common in composite materials and sealants, do not significantly absorb RF radiation and thus are not significantly susceptible to dielectric heating. One way to heat such a material by RF radiation is to introduce a susceptor 30 into the volume of the material. A susceptor 30 is a material that has a significant absorbance of RF radiation and heats due to the absorption of RF energy. Further, when the susceptor 30 heats due to RF radiation, the susceptor 30 may conduct that heat to neighboring materials. Susceptors 30 typically are conductive, e.g., a conductor or a semiconductor. Suitable susceptors 30 may include, or may be, a metal, iron, iron oxide, nickel, carbon, and silicon.

Large conductors (such as bulk metals) typically reflect RF radiation and thus may shield objects from RF radiation. Hence, large conductors are not particularly suitable for dielectric heating. However, small conductive particles and conductive materials with small features may primarily absorb RF radiation instead of reflecting RF radiation. Hence, conductive materials with small dimensions and/or small features may serve as susceptors 30 of RF radiation. For example, susceptors 30 may be, or may include, a needle, a wire, a film, a powder, and/or a microparticle. Susceptors 30 in the form of a needle or a wire may have a diameter of greater than 0.1 mm, 0.2 mm, 0.3 mm, 0.4 mm, 0.5 mm, 0.6 mm, 0.8 mm, or 1 mm, and/or less than 4 mm, 2 mm, 1 mm, or 0.8 mm. A film may have a thickness of greater than 0.1 μm, 0.2 μm, 0.5 μm, 1 μm, 2 μm, 5 μm, 10 μm, 20 μm, 50 μm, or 100 μm, and/or less than 500 μm, 200 μm, 100 μm, 50 μm, 20 μm, 10 μm, 5 μm, 2 μm, or 1 μm.

Susceptors 30 in the form of powders and/or microparticles may be small enough to be dispersed in a bulk material such as sealant 14. Powders and/or microparticles may come in a variety of forms and may include at least one particle that is at least one of spherical, rod-shaped, flaked, irregular-shaped (e.g., granular), fibrous (thread-like, non-rigid), angular (with sharp angles), and acicular (needle-shaped, rigid). Though potentially including many non-spherical shapes, powders and/or microparticles may be characterized by the median equivalent diameter of the particles. The median equivalent diameter of a group of particles is referred to as the D50. Half of the population of the group of particles has an equivalent diameter below the D50 and half has an equivalent diameter above the D50. Particle distributions may also be characterized by other measures of equivalent diameter, such as the D10, D20, D80, and/or D90 (corresponding to the equivalent diameter at which 10%, 20%, 80%, and/or 90%, respectively, of the particles are below the respective equivalent diameter). A powder and/or microparticles may have a median equivalent diameter of greater than 0.1 μm, 0.2 μm, 0.5 μm, 1 μm, 2 μm, 5 μm, 10 μm, 20 μm, 50 μm, or 100 μm, and/or less than 500 μm, 200 μm, 100 μm, 50 μm, 20 μm, 10 μm, 5 μm, 2 μm, or 1 μm.

The susceptor 30 may be a component of the sealant 14 before and/or after curing, and/or may be introduced to the cured sealant 14 to allow the susceptor-sealant combination to absorb RF radiation and heat.

The sealant 14 may be formulated with susceptor 30 included and/or may be a combination of ordinary sealant and susceptor 30. For example, susceptor 30 may be introduced to cured sealant 14 by mixing the susceptor 30 into an uncured sealant 14 and curing the sealant 14 to form the cured sealant 14. The mixing may result in a homogeneous mixture of susceptor 30 and uncured sealant 14. Generally, the amount of susceptor 30 mixed into the uncured sealant 14 is kept low enough to avoid significantly affecting properties of the uncured and/or cured sealant 14 other than the absorption of RF energy. For example, the weight percent of the susceptor in such a mixture may be 0.01%-10%, 0.01%-1%, about 0.1%, or about 0.05%.

Uncured sealant 14 may have a limited working time before the sealant 14 begins to significantly cure and ceases to properly bond to substrates 12. For example, room temperature curing sealants, which may be, e.g., synthetic rubber and/or polysulfides, may have a working time of minutes to hours after mixing the individual uncured sealant components 28 (typically at specific, stoichiometric ratios). Susceptor 30 may be introduced into one of the uncured sealant components 28 prior to mixing to form the uncured sealant 14 and/or susceptor 30 may be introduced into the uncured sealant 14 during the working time of the uncured sealant 14.

Additionally or alternatively, susceptor 30 may be introduced into the volume of cured sealant 14 in a sealed interface 16. For example, susceptors 30 may be pierced and/or injected into the cured sealant 14. Susceptors 30 may be configured for piercing the cured sealant 14 (e.g., rigid with a sharp tip) and/or may be carried into the volume of the cured sealant 14 with a tool configured to pierce the cured sealant 14. For example, the cured sealant 14 may be penetrated by a susceptor needle 34, which includes susceptor 30. Susceptor needles 34 generally are rigid and have a tip sharp enough to penetrate cured sealant. For example, susceptor needles 34 may be substantially composed of a susceptor 30 material, such as a metal, and may have a diameter of greater than 0.1 mm, 0.2 mm, 0.3 mm, 0.4 mm, 0.5 mm, 0.6 mm, 0.8 mm, or 1 mm, and/or less than 4 mm, 2 mm, 1 mm, or 0.8 mm.

Figure 2:
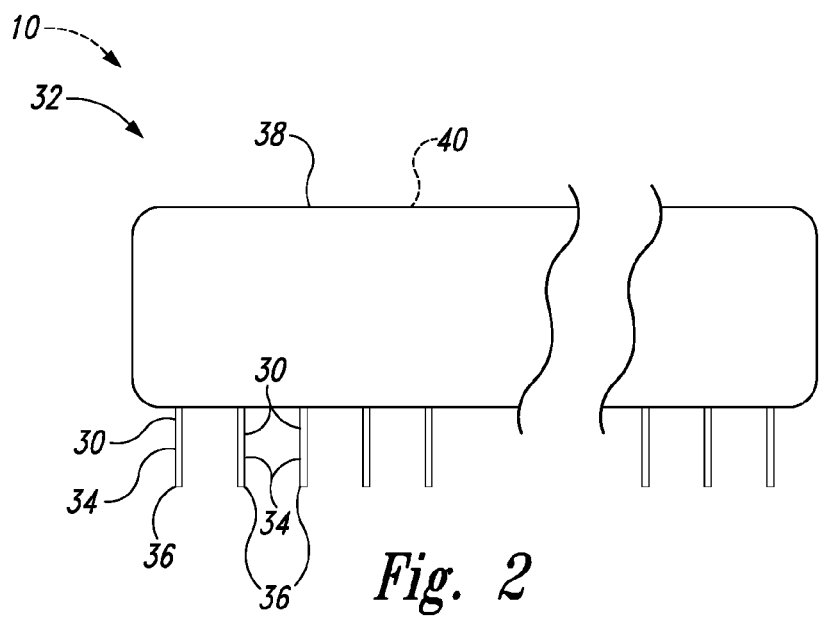
FIG. 2 is an illustrative, non-exclusive example of a susceptor tool.

As viewed in FIG. 2, systems 10 may include a susceptor tool 32 for localized heating of cured sealant 14. The susceptor tool 32 is configured to pierce the cured sealant 14 with susceptor 30 and/or to inject susceptor 30 into the cured sealant 14. As illustrated in the non-exclusive example of FIG. 2, the susceptor tool 32 may comprise one or more susceptor needles 34 and a handle 38 coupled to the one or more susceptor needles 34. The susceptor needle(s) 34 and the susceptor tool 32 are configured to penetrate cured sealant 14. The handle 38 and the susceptor tool 32 are configured such that an operator may apply hand force through the handle 38 to penetrate the cured sealant 14 with the susceptor needle(s) 34.

The susceptor tool 32 and/or the susceptor needle(s) 34 may be configured to avoid damage to a substrate 12 bonded to the cured sealant 14 when the susceptor tool 32 is used to penetrate the cured sealant 14. Some substrates 12, such as composite material substrates 12, may be relatively sensitive to scratches and, hence, susceptor needles 34 may include a tip 36 that is softer than the substrate 12. For example, the susceptor needle tip 36 may be plastic and/or have a hardness of less than 80, 90, or 95 on the Shore-A hardness scale, and/or less than 30, 40, or 50 on the Shore-D hardness scale.

Susceptor needle(s) 34 may extend from the handle 38 a suitable distance to maneuver the susceptor tool 32 into position near a sealed interface 16 and to penetrate the cured sealant 14. For example, the susceptor needle(s) 34 may extend from the handle 38 at least 5 mm, 10 mm, 20 mm, or 40 mm, and/or less than 100 mm, 50 mm, or 30 mm.

Where a susceptor tool 32 includes a plurality of susceptor needles 34, the susceptor needles may be arranged in a spaced apart array, optionally a linear array, configured to allow the susceptor needles 34 to penetrate an extended portion of sealant 14, for example a bead of sealant 14 along a fillet 20 and/or a seal cap 22. The array of susceptor needles 34 may form a substantially periodic array as shown in the non-exclusive example of FIG. 2. The spacing between the susceptor needles may be at least 1 mm, 2 mm, 5 mm, or 10 mm, and/or less than 50 mm, 20 mm, 10 mm, or 5 mm. A susceptor needle 34 may be in electrical contact with one or more other susceptor needles 34. Electrical contact may be configured to enhance and/or redirect the effects of RF radiation impinging on the susceptor needles 34.

The handle 38 generally is configured to not substantially heat when exposed to RF radiation, in particular when exposed to RF radiation selected to heat the susceptor needle(s) 34. Further, the handle 38 may be thermally and/or electrically insulated from the susceptor needle(s) 34. The handle 38 may include an RF shield 40, such as a conductive mesh or foil, to shield the handle 38 from RF radiation and the potential for dielectric heating when exposed to RF radiation. The RF shield 40 may be configured to reduce dielectric heating of susceptor needle(s) 34 where they contact and/or where they are coupled to the handle 38. Additionally or alternatively, the susceptor needle(s) 34 may each independently detach, e.g., break and/or release from, the handle 38 so that the handle 38 may be removed from the proximity of the sealant 14 with the embedded susceptor needles(s) 34.

Figure 3:
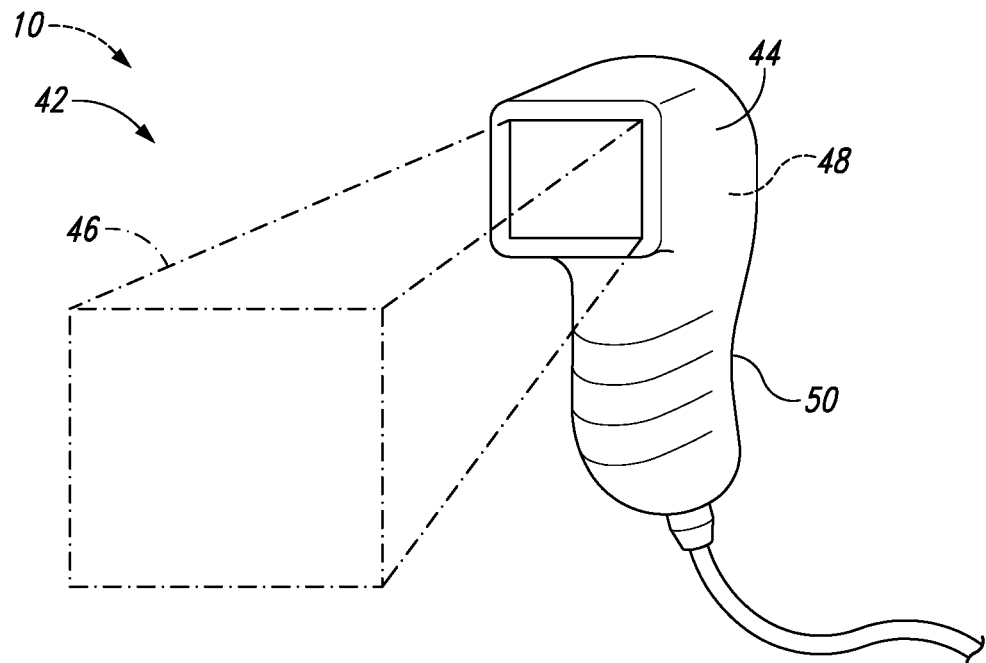
FIG. 3 is an illustrative, non-exclusive example of a handheld radio-frequency heater.

As viewed in FIG. 3, systems 10 may comprise a handheld RF heater 42 configured to direct a beam 46 of RF radiation into a volume of a sealant 14 that includes susceptor 30. The RF heater 42 comprises an RF emitter 44 configured to emit the beam 46 of RF radiation and a handle 50 coupled to the RF emitter 44.

The RF emitter 44 may emit electromagnetic radiation primarily in the microwave spectrum and, hence, be referred to as a microwave emitter. Likewise, the handheld RF heater 42 may be referred to as a handheld microwave heater if the RF emitter 44 is a microwave emitter. The RF emitter 44 may include suitable electromagnetic radiation generation mechanisms such as a magnetron and/or an induction coil. The RF emitter 44 and/or the handheld RF heater 42 may be configured to emit a focused beam and/or a collimated beam of RF radiation. Further, the handheld RF heater 42 and/or the RF emitter 44 may direct and/or emit a plurality of beams 46 of RF radiation.

The handheld RF heater 42 and/or the RF emitter 44 may be configured to emit a beam 46 with an intensity of less than 1000 W, 300 W, 100 W, 30 W, 10 W, 3 W, or 1 W, and/or greater than 0.1 W, 0.3 W, 1 W, 3 W, or 10 W. The handheld RF heater 42 and/or the RF emitter 44 may be configured to emit a pulse and/or a burst of RF radiation. The duration of the pulse and/or burst may be at least 0.1 s, 0.5 s, 1 s, 5 s, or 10 s, and/or less than 60 s, 30 s, 20 s, 10 s, or 5 s.

The handheld RF heater 42 may comprise a thermal sensor 48 configured to measure the temperature of a surface and/or a volume of a material illuminated by the beam 46 (e.g., the temperature of the cured sealant 14 and/or the substrate 12 within and/or proximate to a sealed interface 16). The thermal sensor 48 may be configured to measure temperatures within the expected range of ambient environments and heated sealant 14, for example, −40° C.-200° C., 0° C.-200° C., and/or 0° C.-100° C. The thermal sensor 48 may be, or may include, a non-contact thermal sensor, a pyrometer, an infrared thermometer, and/or an infrared sensor.

Figure 4:
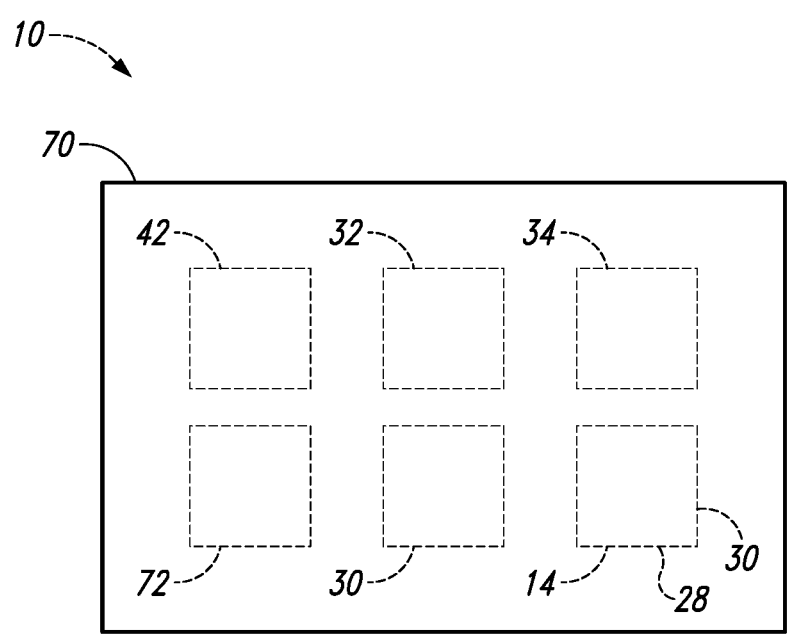
FIG. 4 is a schematic representation of kits according to the present disclosure.

As viewed in FIG. 4, systems 10 may comprise a kit 70 including various components of system 10. For example, a kit 70 may include combinations of one or more of an RF heater 42, a susceptor tool 32, a susceptor needle 34, a susceptor 30, and a sealant removal tool 72 such as a scraper, a knife, and/or a pick. Further, kits may include uncured sealant components 28, which may include susceptor 30.

The sealant removal tool 72 may be configured to avoid damage to a substrate 12 bonded to the cured sealant 14 and/or the sealant removal tool 72 may be softer than the substrate 12 bonded to the cured sealant 14. The sealant removal tool may include a tip with a hardness of less than 80, 90, or 95 on the Shore-A hardness scale, and/or less than 30, 40, or 50 on the Shore-D hardness scale.

Sealant 14 may be used with aircraft 60, for example in fuel tanks 62, the fuselage 64, and/or other pressure and/or fluid containers. Fuel tanks 62 may be contained in the wings of aircraft 60, for example, in a wet wing configuration in which a portion of the internal volume of the wing is sealed and configured to store fuel for the aircraft engine(s). Fuel tanks 62 may include several component parts joined together. Each of these parts may be a substrate 12. Where the parts are joined together, sealant 14 is applied to form a sealed interface 16 and to ultimately seal the fuel tank 62. Further, edges of parts, fasteners (e.g., fastener 24), components within the fuel tank 62, as well as corners in the interior of the fuel tank 62 may be covered with sealant 14 such as with a fillet 20 and/or a seal cap 22. For fuel tanks 62, the properties of the sealant 14, the thickness of the application of sealant 14, and the quality of the application of sealant 14 (e.g., coverage, number of voids, bubbles, etc.) are tightly controlled to ensure a good, lasting seal able to withstand the rigors of use.

Figure 5:
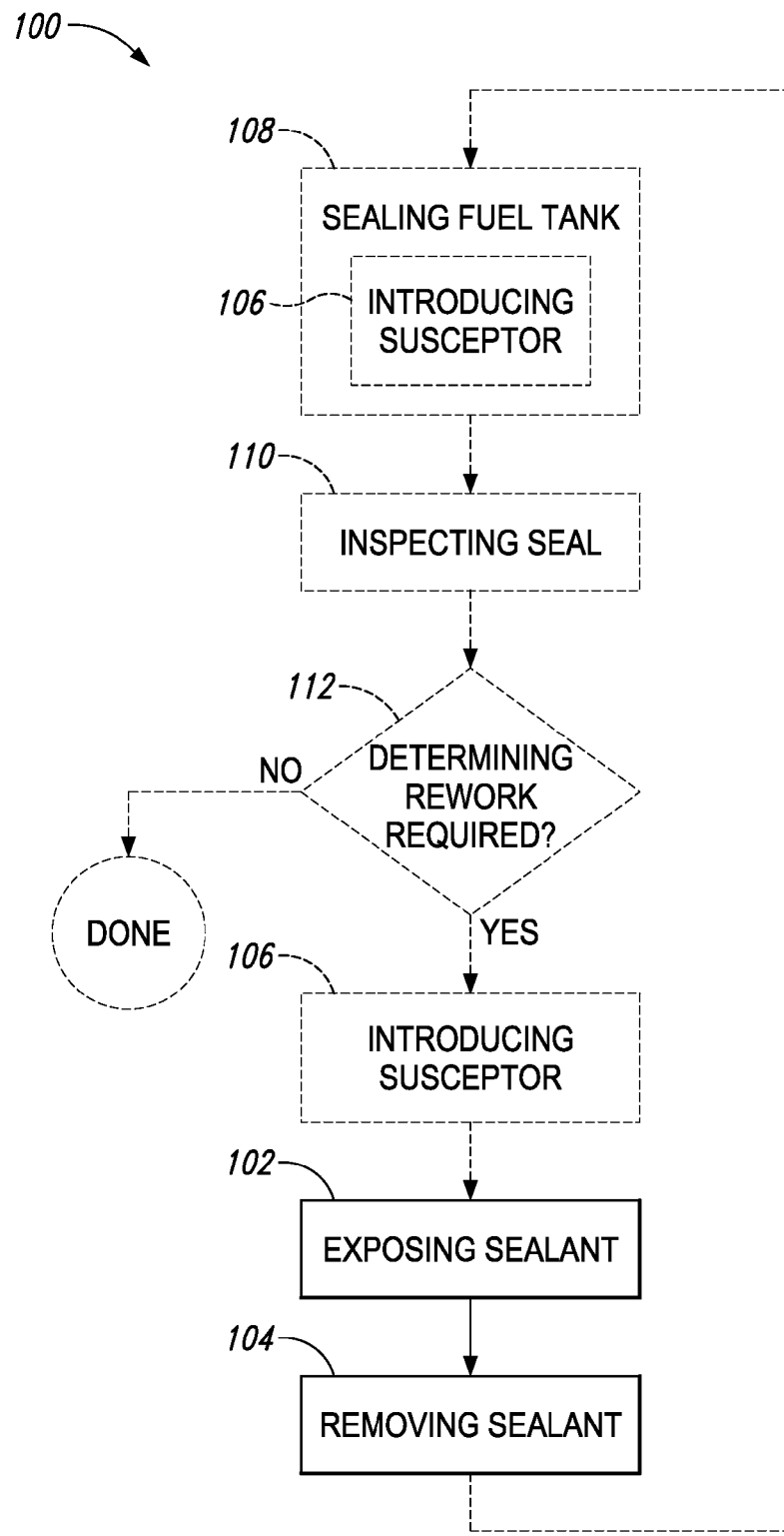
FIG. 5 is a schematic representation of methods for radio-frequency assisted removal of sealant.

As viewed in FIG. 5, methods 100 generally comprise exposing 102 a volume of cured sealant that includes a susceptor to RF radiation and then physically removing 104 the exposed sealant. The sealant may be sealant 14, for example, sealant 14 in a sealed interface 16 bonded to a substrate 12. The susceptor may be susceptor 30.

The exposing 102 is sufficient to heat the susceptor within the volume of sealant to degrade the bond strength of the sealant to a substrate in a sealed interface. The sealant after exposure sufficient to reduce the bond strength may be referred to as reduced bond-strength sealant. Generally, the heat due to the RF radiation softens the sealant and may alter other chemical and mechanical properties.

The exposing 102 may include exposing the sealant for sufficient time to reduce the bond strength of the sealant. For example, the exposing 102 may include exposing the volume of cured sealant for at least 0.1 s, 0.5 s, 1 s, 5 s, or 10 s, and/or less than 60 s, 30 s, 20 s, 10 s, or 5 s. The exposing 102 may include heating the sealant to a sufficient temperature to reduce the bond strength of the sealant. For example, the exposing 102 may include heating the volume of the cured sealant to greater than 40° C., 50° C., 70° C., 100° C., 120° C., or 150° C., and/or less than 200° C., 150° C., 120° C., 100° C., 80° C., 70° C., 60° C., or 50° C. Typically, the exposing 102 is performed in a manner that avoids excessive heating in the substrate. For example, exposing 102 may include avoiding temperatures at a substrate that may degrade the substrate (e.g., a composite substrate). Avoiding excessive heating may include selecting and/or emitting RF radiation that is not substantially absorbed by the substrate; it may include cooling the substrate; and/or it may include heating the volume of cured sealant to a temperature low enough to avoid significant conduction of heat to the substrate. Exposing 102 may include heating the substrate proximate to the volume of the cured sealant to less than 40° C., 50° C., 60° C., 70° C., 80° C., 90° C., 100° C., 120° C., or 150° C.

The exposing 102 may include selecting one or more RF radiation properties to preferentially heat the susceptor relative to the cured sealant and/or the substrate bonded to the cured sealant. The properties selected may include the intensity, the frequency, and/or the duration of the RF radiation exposure. For example, exposing 102 may include selecting the intensity, frequency, and/or duration of RF radiation exposure to sufficiently heat the cured sealant to reduce the bond strength while not substantially heating the substrate.

The exposing 102 may include exposing a sealed interface and, optionally, neighboring regions. For example, exposing 102 may include exposing an elongated volume of the cured sealant and/or exposing at least a portion of a sealed joint, a fillet, and/or an end-cap seal.

The exposing 102 may include directing RF radiation into the volume of the cured sealant, for example, by using an RF heater to expose the sealant to RF radiation and/or to direct RF radiation to the sealant. The RF heater may be RF heater 42.

The physically removing 104 the exposed, reduced bond-strength sealant generally includes the use of mechanical force, for example by stripping, scraping, abrading, and/or mechanically releasing the sealant. The physically removing 104 may remove substantially all of the reduced bond-strength sealant and/or separate substantially all of the reduced bond-strength sealant from the substrate. The physically removing 104 generally is performed without significant damage to the substrate originally bonded to the sealant, for example by using tools with edges and/or tips that are softer than the substrate.

Methods 100 may further comprise introducing 106 susceptor into the cured sealant, prior to the exposing 102. The introducing 106 may include penetrating the cured sealant with one or more susceptor needles, such as susceptor needles 34. The penetrating with susceptor needle(s) may be performed by hand force, such as hand force applied through a handle coupled to the susceptor needle(s). For example, introducing 106 may include penetrating the cured sealant with the susceptor needle(s) 34 of susceptor tool 32. Introducing 106 and/or penetrating generally are performed without significant damage to the substrate bonded to the sealant. For example, any tools, such as susceptor tool 32 and/or susceptor needle 34, and/or any susceptor may have edges and/or tips that are softer than the substrate. Additionally or alternatively, introducing 106 and/or penetrating may be performed without touching the substrate bonded to the sealant.

Introducing 106 may include mixing susceptor into an uncured sealant and curing the uncured sealant with susceptor to form the cured sealant. Further, introducing 106 may include mixing susceptor into a component and/or precursor of the uncured sealant, forming the uncured sealant with the susceptor in the component and/or precursor, and then curing the sealant to form the cured sealant. Either type of mixing may result in a homogeneous mixture of susceptor and uncured sealant and may result in no significant changes to the uncured sealant, and the resulting cured sealant, except for the increased RF absorbance due to the susceptor. In the resulting mixture of uncured sealant and susceptor, the weight percent of the susceptor may be 0.01%-10%, 0.01%-1%, about 0.1%, or about 0.05%. When the mixing occurs after the formation of the uncured sealant, the mixing occurs during the working time of the uncured sealant. Forming the uncured sealant, with or without susceptor, may include creating a mixture of sealant components and/or precursors. Additionally or alternatively, methods 100 may include selecting an uncured sealant that includes susceptor. Introducing 106 and/or selecting may be followed by applying the uncured sealant to the substrate, for example, to form at least part of a sealed interface such as a sealed joint, a fillet, and/or an end-cap seal.

Methods 100 may further comprise a method for manufacturing, repairing, and/or restoring a structure with a sealed interface, for example a method for manufacturing, repairing, and/or restoring a fuel tank in an aircraft. Such methods 100 may comprise sealing 108 the fuel tank with sealant and then inspecting 110 the sealant, and/or the resulting seal, in the fuel tank to determine whether the fuel tank is properly sealed. Sealing 108 may include applying uncured sealant to the fuel tank and curing the uncured sealant to form cured sealant. Inspecting 110 may include inspecting the cured sealant and the sealed interfaces formed by the cured sealant. Methods may further comprise determining 112, based on the inspecting 110, that rework of the seals formed by the sealant is desired and/or required, for example because the fuel tank is not properly sealed, the fuel tank leaks, and/or the fuel tank includes defects in the seals. If rework is desired and/or required, cured sealant is removed, using the exposing 102, the removing 104, and/or the introducing 106. Once the fuel tank is free of the offending sealant and/or sealed interface(s), the sealing 108 may be repeated, followed by the process of inspecting 110 and determining 112.

Illustrative, non-exclusive examples of inventive subject matter according to the present disclosure are described in the following Examples A-E.

EXAMPLE A

Methods of RF-Assisted Sealant Removal

One example of the present disclosure relates to a method comprising exposing a volume of a cured sealant to radio-frequency radiation, wherein the cured sealant is bonded to a substrate and wherein the exposing is sufficient to heat a susceptor within the volume to form a reduced bond-strength sealant; and physically removing the reduced bond-strength sealant from the substrate.

In one instance, the method further comprises introducing susceptor into the cured sealant, prior to the exposing.

The introducing may include penetrating the cured sealant with a susceptor needle, where the susceptor needle may include a susceptor needle tip, optionally a plastic susceptor needle tip. The susceptor needle tip may be configured to avoid damage to a substrate bonded to the cured sealant.

The susceptor needle tip may be softer than a/the substrate bonded to the cured sealant. The susceptor needle tip may have a hardness of less than 80, 90, or 95 on the Shore-A hardness scale, and/or less than 30, 40, or 50 on the Shore-D hardness scale. The penetrating the cured sealant may include applying hand force through a handle coupled to the susceptor needle. The susceptor needle may have a diameter of greater than 0.1 mm, 0.2 mm, 0.3 mm, 0.4 mm, 0.5 mm, 0.6 mm, 0.8 mm, or 1 mm, and/or less than 4 mm, 2 mm, 1 mm, or 0.8 mm. The penetrating may include penetrating the cured sealant with a plurality of susceptor needles. The susceptor needle may be a portion of a susceptor tool, optionally a susceptor tool of any instance of Example B.

The introducing may include mixing the susceptor into an uncured sealant and curing the sealant to form the cured sealant. The mixing may result in a homogeneous mixture of susceptor and uncured sealant, optionally where a weight percent of the susceptor in the mixture is 0.01%-10%, 0.01%-1%, about 0.1%, or about 0.05%. The mixing may occur during a working time of the uncured sealant. The introducing may further include forming the uncured sealant by creating a mixture of sealant components, optionally by creating a stoichiometric mixture of sealant components. The uncured sealant may include at least one of a synthetic rubber precursor, a polysulfide precursor, a polyurethane precursor, a polyurea precursor, a polythioether precursor, and an epoxy precursor. The introducing may further include applying the uncured sealant to a/the substrate, optionally to form at least part of at least one of a sealed joint, a fillet, and an end-cap seal.

In another instance, which may include the subject matter of any of the preceding instances in Example A, the method further comprises applying an uncured sealant to a/the substrate and curing the uncured sealant to form the cured sealant, optionally to form at least a part of at least one of a sealed joint, a fillet, and an end-cap seal. The uncured sealant may include the susceptor.

In another instance, which may include the subject matter of any of the preceding instances in Example A, the method further comprises selecting an uncured sealant that includes the susceptor. The uncured sealant may include at least one of a synthetic rubber precursor, a polysulfide precursor, a polyurethane precursor, a polyurea precursor, a polythioether precursor, and an epoxy precursor. The method may further comprise applying the uncured sealant to a/the substrate, optionally to form at least part of at least one of a sealed joint, a fillet, and an end-cap seal.

In another instance, which may include the subject matter of any of the preceding instances in Example A, the cured sealant includes at least one of synthetic rubber, polysulfide, polyurethane, polyurea, polythioether, and epoxy.

In another instance, which may include the subject matter of any of the preceding instances in Example A, the cured sealant is an adhesive.

In another instance, which may include the subject matter of any of the preceding instances in Example A, the cured sealant forms at least a part of at least one of a sealed joint, a fillet, and an end-cap seal.

In another instance, which may include the subject matter of any of the preceding instances in Example A, the susceptor is a material that absorbs energy from radio-frequency radiation and reemits the energy as heat. The susceptor may include, or be, at least one of a metal, iron, iron oxide, nickel, carbon, and silicon. The susceptor may include, or be, at least one of a needle, a wire, and a film. The susceptor may include, or be, at least one of powder and microparticles. The median equivalent diameter of the powder and/or microparticles may be greater than 0.1 μm, 0.2 μm, 0.5 μm, 1 μm, 2 μm, 5 μm, 10 μm, 20 μm, 50 μm, or 100 μm, and/or less than 500 μm, 200 μm, 100 μm, 50 μm, 20 μm, 10 μm, 5 μm, 2 μm, or 1 μm.

In another instance, which may include the subject matter of any of the preceding instances in Example A, the cured sealant is bonded to a substrate, optionally where the substrate is at least one of a composite material, a fiber-reinforced plastic, a carbon-fiber composite, carbon-fiber reinforced composite, a laminate material, a polymer, a reinforced polymer, a filled polymer, and a metal, optionally where the substrate is at least a portion of at least one of a fuel tank, a fuselage, and an aircraft.

In another instance, which may include the subject matter of any of the preceding instances in Example A, the exposing includes exposing for sufficient time to reduce a bonding strength of the cured sealant to form the reduced bond-strength sealant.

In another instance, which may include the subject matter of any of the preceding instances in Example A, the exposing includes exposing an elongated volume of the cured sealant.

In another instance, which may include the subject matter of any of the preceding instances in Example A, the exposing includes exposing at least a portion of at least one of a sealed joint, a fillet, and an end-cap seal.

In another instance, which may include the subject matter of any of the preceding instances in Example A, the exposing includes heating the volume of the cured sealant to greater than 40° C., 50° C., 70° C., 100° C., 120° C., or 150° C., and/or less than 200° C., 150° C., 120° C., 100° C., 80° C., 70° C., 60° C., or 50° C.

In another instance, which may include the subject matter of any of the preceding instances in Example A, the exposing includes exposing the volume for at least 0.1 s, 0.5 s, 1 s, 5 s, or 10 s, and/or less than 60 s, 30 s, 20 s, 10 s, or 5 s.

In another instance, which may include the subject matter of any of the preceding instances in Example A, the exposing includes selecting one or more radio-frequency radiation properties to preferentially heat the susceptor relative to the cured sealant and/or a/the substrate bonded to the cured sealant, optionally where the properties include at least one of intensity, frequency, and duration.

In another instance, which may include the subject matter of any of the preceding instances in Example A, the radio-frequency radiation is microwave radiation.

In another instance, which may include the subject matter of any of the preceding instances in Example A, the radio-frequency radiation includes a frequency in a band of 30 kHz-300 GHz, 1 MHz-300 MHz, 300 MHz-300 GHz, 800 MHz-30 GHz, 2 GHz-20 GHz, about 915 MHz, about 2.45 GHz, or about 5.8 GHz.

In another instance, which may include the subject matter of any of the preceding instances in Example A, the radio-frequency radiation has an intensity of less than 1000 W, 300 W, 100 W, 30 W, 10 W, 3 W, or 1 W, and/or greater than 0.1 W, 0.3 W, 1 W, 3 W, or 10 W.

In another instance, which may include the subject matter of any of the preceding instances in Example A, the exposing includes directing radio-frequency radiation into the volume of the cured sealant.

In another instance, which may include the subject matter of any of the preceding instances in Example A, the exposing includes using a radio-frequency heater, optionally a microwave heater, to expose the volume to radio-frequency radiation. The radio-frequency heater may be handheld, and optionally may be the handheld radio-frequency heater of any instance of Example C. The radio-frequency heater may include a magnetron. The radio-frequency heater may include an induction coil. The radio-frequency heater may emit at least one of a focused beam and a collimated beam of radio-frequency radiation.

In another instance, which may include the subject matter of any of the preceding instances in Example A, the physically removing includes at least one of using mechanical force, stripping, scraping, abrading, and mechanically releasing.

In another instance, which may include the subject matter of any of the preceding instances in Example A, the physically removing removes substantially all of the reduced bond-strength sealant.

In another instance, which may include the subject matter of any of the preceding instances in Example A, the physically removing removes the reduced bond-strength sealant without significant damage to the/a substrate.

In another instance, which may include the subject matter of any of the preceding instances in Example A, the method is a method of sealing a fuel tank within an aircraft, the method comprising sealing the fuel tank with sealant by applying a first quantity of uncured sealant to the fuel tank and by curing the first quantity of uncured sealant to form a first cured sealant; inspecting the first cured sealant in the fuel tank to determine if the fuel tank is properly sealed; determining that the fuel tank is not properly sealed; exposing a volume of the first cured sealant to radio-frequency radiation sufficient to heat a susceptor within the volume to form a reduced bond-strength sealant; optionally according to any of the previous instances of this Example A; physically removing the reduced bond-strength sealant, optionally according to any of the previous instances of this Example A; and optionally sealing the fuel tank with sealant by applying a second quantity of uncured sealant to the fuel tank and by curing the second quantity of uncured sealant to form a second cured sealant.

EXAMPLE B

Susceptor Tools

Another example of the present disclosure relates to a susceptor tool for localized heating of cured sealant, the susceptor tool comprising one or more susceptor needles; and a handle coupled to the one or more susceptor needles; where the susceptor tool is configured to penetrate a cured sealant bonded to a composite substrate, and to absorb radio-frequency radiation in the cured sealant.

In one instance, at least one of the susceptor needles includes a susceptor needle tip, optionally a plastic susceptor needle tip. The susceptor needle tip may be configured to avoid damage to the composite substrate. The susceptor needle tip may be softer than the composite substrate. The susceptor needle tip may have a hardness of less than 80, 90, or 95 on the Shore-A hardness scale, and/or less than 30, 40, or 50 on the Shore-D hardness scale.

In another instance, which may include the subject matter of any of the preceding instances in Example B, at least one of the susceptor needles has a diameter of greater than 0.1 mm, 0.2 mm, 0.3 mm, 0.4 mm, 0.5 mm, 0.6 mm, 0.8 mm, or 1 mm, and/or less than 4 mm, 2 mm, 1 mm, or 0.8 mm.

In another instance, which may include the subject matter of any of the preceding instances in Example B, at least one of the susceptor needles extends from the handle at least 5 mm, 10 mm, 20 mm, or 40 mm, and/or less than 100 mm, 50 mm, or 30 mm.

In another instance, which may include the subject matter of any of the preceding instances in Example B, the susceptor tool includes a plurality of susceptor needles. The plurality of susceptor needles may be spaced apart from each other, optionally in a periodic array. The spacing between the needles may be at least 1 mm, 2 mm, 5 mm, or 10 mm, and/or less than 50 mm, 20 mm, 10 mm, or 5 mm. At least two of the plurality of the susceptor needles may be in electrical contact.

In another instance, which may include the subject matter of any of the preceding instances in Example B, the susceptor needles each include a susceptor that absorbs energy from radio-frequency radiation and reemits the energy as heat.

In another instance, which may include the subject matter of any of the preceding instances in Example B, susceptor needles each independently include, or are, at least one of metal, iron, iron oxide, nickel, and silicon.

In another instance, which may include the subject matter of any of the preceding instances in Example B, the radio-frequency radiation is microwave radiation.

In another instance, which may include the subject matter of any of the preceding instances in Example B, the radio-frequency radiation includes a frequency in a band of 30 kHz-300 GHz, 1 MHz-300 MHz, 300 MHz-300 GHz, 800 MHz-30 GHz, 2 GHz-20 GHz, about 915 MHz, about 2.45 GHz, or about 5.8 GHz.

In another instance, which may include the subject matter of any of the preceding instances in Example B, the radio-frequency radiation has an intensity of less than 1000 W, 300 W, 100 W, 30 W, 10 W, 3 W, or 1 W, and/or greater than 0.1 W, 0.3 W, 1 W, 3 W, or 10 W.

In another instance, which may include the subject matter of any of the preceding instances in Example B, the susceptor tool is configured to penetrate the cured sealant with the susceptor needles by hand force applied through the handle.

In another instance, which may include the subject matter of any of the preceding instances in Example B, the handle is configured to not substantially heat when exposed to the radio-frequency radiation.

In another instance, which may include the subject matter of any of the preceding instances in Example B, the handle includes a radio-frequency shield configured to attenuate the radio-frequency radiation within the handle.

In another instance, which may include the subject matter of any of the preceding instances in Example B, the handle is thermally insulated from the susceptor needles.

EXAMPLE C

Handheld RF Heaters

Another example of the present disclosure relates to a handheld radio-frequency heater comprising a radio-frequency emitter configured to emit a beam of radio-frequency radiation; and a handle coupled to the radio-frequency emitter.

In one instance, the radio-frequency radiation is microwave radiation.

In another instance, which may include the subject matter of any of the preceding instances in Example C, the radio-frequency radiation includes a frequency in a band of 30 kHz-300 GHz, 1 MHz-300 MHz, 300 MHz-300 GHz, 800 MHz-30 GHz, 2 GHz-20 GHz, about 915 MHz, about 2.45 GHz, or about 5.8 GHz.

In another instance, which may include the subject matter of any of the preceding instances in Example C, the beam of radio-frequency radiation has an intensity of less than 1000 W, 300 W, 100 W, 30 W, 10 W, 3 W, or 1 W, and/or greater than 0.1 W, 0.3 W, 1 W, 3 W, or 10 W.

In another instance, which may include the subject matter of any of the preceding instances in Example C, the radio-frequency heater is configured to direct radio-frequency radiation into a volume of a material, optionally a volume of a cured sealant bonded to a composite structure.

In another instance, which may include the subject matter of any of the preceding instances in Example C, the radio-frequency emitter includes a magnetron.

In another instance, which may include the subject matter of any of the preceding instances in Example C, the radio-frequency emitter includes an induction coil.

In another instance, which may include the subject matter of any of the preceding instances in Example C, the beam is at least one of a focused beam and a collimated beam of radio-frequency radiation.

In another instance, which may include the subject matter of any of the preceding instances in Example C, the radio-frequency emitter is configured to emit a beam of radio-frequency radiation for at least 0.1 s, 0.5 s, 1 s, 5 s, or 10 s, and/or less than 60 s, 30 s, 20 s, 10 s, or 5 s.

In another instance, which may include the subject matter of any of the preceding instances in Example C, the handheld radio-frequency heater further comprises a thermal sensor. The thermal sensor may be configured to measure a temperature of a surface and/or a volume of a material illuminated by the beam, optionally where the material is a cured sealant bonded to a composite structure. The thermal sensor may be configured to measure a temperature of −40° C.-200° C., 0° C.-200° C., or 0° C.-100° C. The thermal sensor may be, or may include, at least one of a non-contact thermal sensor, a pyrometer, an infrared thermometer, and an infrared sensor.

EXAMPLE D

Kits

Another example of the present disclosure relates to a kit comprising: the handheld radio-frequency heater of any instance of Example C; and at least one of the susceptor tool of any instance of Example B and a sealant removal tool.

In one instance, the kit is configured to perform the method of any instance of Example A.

In another instance, which may include the subject matter of any of the preceding instances in Example D, the sealant removal tool includes a tip with a hardness of less than 80, 90, or 95 on the Shore-A hardness scale, and/or less than 30, 40, or 50 on the Shore-D hardness scale.

In another instance, which may include the subject matter of any of the preceding instances in Example D, the sealant removal tool is configured to avoid damage to a substrate bonded to a cured sealant and/or the sealant removal tool is softer than a/the substrate bonded to a cured sealant. The cured sealant may include at least one of synthetic rubber, polysulfide, polyurethane, polyurea, polythioether, and epoxy. The cured sealant may be an adhesive. The cured sealant may form at least a part of at least one of a sealed joint, a fillet, and an end-cap seal. The substrate may be at least one of a composite material, a fiber-reinforced plastic, a carbon-fiber composite, carbon-fiber reinforced composite, a laminate material, a polymer, a reinforced polymer, a filled polymer, and a metal, optionally where the substrate is at least a portion of at least one of a fuel tank, a fuselage, and an aircraft.

EXAMPLE E

Systems

Another example of the present disclosure relates to a system comprising: a substrate; a volume of cured sealant bonded to the substrate, where the volume of cured sealant includes a susceptor; a sealed interface that includes the volume of cured sealant and the substrate; and a radio-frequency heater emitting a beam of radio-frequency radiation; where at least a portion of the beam of radio-frequency radiation is absorbed by the susceptor inside the volume of cured sealant.

In one instance, the substrate is at least one of a composite material, a fiber-reinforced plastic, a carbon-fiber composite, carbon-fiber reinforced composite, a laminate material, a polymer, a reinforced polymer, a filled polymer, and a metal, optionally where the substrate is at least a portion of at least one of a fuel tank, a fuselage, and an aircraft.

In another instance, which may include the subject matter of any of the preceding instances in Example E, the cured sealant includes at least one of synthetic rubber, polysulfide, polyurethane, polyurea, polythioether, and epoxy.

In another instance, which may include the subject matter of any of the preceding instances in Example E, the cured sealant is an adhesive.

In another instance, which may include the subject matter of any of the preceding instances in Example E, the cured sealant forms at least a part of at least one of a sealed joint, a fillet, and an end-cap seal.

In another instance, which may include the subject matter of any of the preceding instances in Example E, the sealed interface is at least one of a sealed joint, a fillet, and an end-cap seal.

In another instance, which may include the subject matter of any of the preceding instances in Example E, the radio-frequency heater is the radio-frequency heater of any instance of Example C.

In another instance, which may include the subject matter of any of the preceding instances in Example E, the radio-frequency radiation is microwave radiation.

In another instance, which may include the subject matter of any of the preceding instances in Example E, the radio-frequency radiation includes a frequency in a band of 30 kHz-300 GHz, 1 MHz-300 MHz, 300 MHz-300 GHz, 800 MHz-30 GHz, 2 GHz-20 GHz, about 915 MHz, about 2.45 GHz, or about 5.8 GHz.

In another instance, which may include the subject matter of any of the preceding instances in Example E, the beam of radio-frequency radiation has an intensity of less than 1000 W, 300 W, 100 W, 30 W, 10 W, 3 W, or 1 W, and/or greater than 0.1 W, 0.3 W, 1 W, 3 W, or 10 W.

In another instance, which may include the subject matter of any of the preceding instances in Example E, the susceptor is at least a portion of a susceptor tool, optionally the susceptor tool of any instance of Example B.

In another instance, which may include the subject matter of any of the preceding instances in Example E, the susceptor is a susceptor needle. The susceptor needle may include a susceptor needle tip, optionally a plastic susceptor needle tip. The susceptor needle tip may be configured to avoid damage to the substrate. The susceptor needle tip may be softer than the substrate. The susceptor needle tip may have a hardness of less than 80, 90, or 95 on the Shore-A hardness scale, and/or less than 30, 40, or 50 on the Shore-D hardness scale. The susceptor needle may have a diameter of greater than 0.1 mm, 0.2 mm, 0.3 mm, 0.4 mm, 0.5 mm, 0.6 mm, 0.8 mm, or 1 mm, and/or less than 4 mm, 2 mm, 1 mm, or 0.8 mm. The susceptor may be a plurality of susceptor needles.

In another instance, which may include the subject matter of any of the preceding instances in Example E, the susceptor is dispersed within the volume of the cured sealant.

In another instance, which may include the subject matter of any of the preceding instances in Example E, the cured sealant is a homogeneous mixture of susceptor and sealant, optionally where a weight percent of the susceptor in the mixture is 0.01%-10%, 0.01%-1%, about 0.1%, or about 0.05%.

In another instance, which may include the subject matter of any of the preceding instances in Example E, the susceptor is a material that absorbs energy from radio-frequency radiation and reemits the energy as heat.

In another instance, which may include the subject matter of any of the preceding instances in Example E, the susceptor includes, or is, at least one of a metal, iron, iron oxide, nickel, carbon, and silicon.

In another instance, which may include the subject matter of any of the preceding instances in Example E, the susceptor includes, or is, at least one of a needle, a wire, and a film.

In another instance, which may include the subject matter of any of the preceding instances in Example E, the susceptor includes, or is, at least one of powder and microparticles. The median equivalent diameter of the powder and/or microparticles is greater than 0.1 µm, 0.2 µm, 0.5 µm, 1 µm, 2 µm, 5 µm, 10 µm, 20 µm, 50 µm, or 100 µm, and/or less than 500 µm, 200 µm, 100 µm, 50 µm, 20 µm, 10 µm, 5 µm, 2 µm, or 1 µm.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of sealing an interface on an aircraft, the method comprising:
   (a) sealing the interface by applying a first quantity of an uncured sealant to the interface and by curing the first quantity of uncured sealant to form a first cured flexible sealant at the interface, wherein the uncured sealant includes metal susceptor particles, and wherein the uncured sealant is one or more of a synthetic rubber sealant, a polysulfide sealant, a polyurethane sealant, a polyurea sealant, a polythioether sealant, and an epoxy sealant;
   (b) exposing a volume of the first cured flexible sealant to microwave radiation, sufficient to heat the metal susceptor particles within the volume to form a reduced bond-strength sealant;
   (c) physically removing the reduced bond-strength sealant; and
   (d) sealing the interface by applying a second quantity of the uncured sealant to the interface and by curing the second quantity of uncured sealant to form a second cured flexible sealant at the interface.

2. The method of claim 1, wherein the first cured flexible sealant and the second cured flexible sealant each have a Shore-A hardness of less than 60.

3. The method of claim 1, wherein the uncured sealant is a polysulfide sealant.

4. The method of claim 1, wherein a weight percent of the metal susceptor particles in the uncured sealant is 0.01%-1%.

5. The method of claim 1, wherein the metal susceptor particles include at least one of iron, iron oxide, nickel, carbon, and silicon.

6. The method of claim 1, wherein the exposing includes heating the volume to greater than 40° C. and less than 80° C.

7. The method of claim 1, wherein the exposing includes using a handheld microwave heater to expose the volume to microwave radiation.

8. The method of claim 1, further comprising:
   inspecting the first cured flexible sealant at the interface to determine if the interface is properly sealed; and
   determining that the interface is not properly sealed before the exposing.

9. The method of claim 1, wherein the (a) sealing the interface and the (d) sealing the interface each include forming at least one of a sealed joint, a fillet, and an end-cap seal.

10. The method of claim 1, wherein the (a) sealing the interface includes bonding the first cured flexible sealant to a fiber-reinforced plastic substrate, and wherein the (d) sealing the interface includes bonding the second cured flexible sealant to the fiber-reinforced plastic substrate.

* * * * *